Patented Dec. 16, 1952

2,622,044

UNITED STATES PATENT OFFICE 2,622,044

METHOD OF TREATING VULCANIZABLE RUBBER SURFACES

Charles R. Martens, Parma Heights, Ohio, assignor to The Sherwin-Williams Company, Cleveland, Ohio, a corporation of Ohio No Drawing. Application August 2, 1949, Serial No. 108,230

5 Claims. (Cl. 117—139)

1

This invention relates as indicated to a new composition of matter useful as an aid in the curing of rubber articles and particularly in the curing of flat rubber articles desirably having at least one surface free of embossed pattern such as floor mats, rubber tile, rubber sheeting, and other such flat or smooth surfaced articles. The composition of this invention also finds applicability in the molding of articles of irregular contour such as rubber toys, and the like.

This application is related to my concurrently filed application Ser. No. 107,830, filed July 30, 1949, wherein I have claimed generically the compositions of this invention.

The rubber industry has long felt the need of a clear varnish which would not cause rubber articles treated therewith to swell or become tacky and which would permit easy separation of the article from the mold or curing device and, in the case of flat articles, ready separation of plural pieces cured "back-to-back." When one surface is patterned, and the article cured in laminated form without some means of keeping the adjacent surfaces apart, the temperatures and pressures of the cure would cause the pieces to become bonded to one another. Operating in this manner permits doubling or further multiplying the capacity of existing equipment. Various separator compositions have been devised, which while capable of maintaining the pieces separate, have been characterized by numerous difficulties among which are color different from that of the article being cured, tendency to induce swelling and tackiness, necessity of removal of the separating medium after the curing operation, contamination of the molds and curing rolls, instability of solution under heat, slippage, etc.

It is, therefore, among the principal objects of this invention to provide a composition for maintaining separate a plurality of flat or uniformly contoured superimposed rubber articles during the curing and/or molding step, which composition is free from the objectionable properties of causing swelling, tackiness and slippage, and which contains no pigmentary material, or no pigmentary material which is undesirable in the finished product.

It is a further object of this invention to provide a composition useful as a mold lubricant.

Still another object is to provide a finished product or cured rubber product having a glossy finish.

Another object is to provide a low cost rubber separator composition which will not penetrate substantially into the rubber.

Other objects of this invention will appear as the description proceeds.

To the accomplishment of the foregoing and related ends, said invention, then, consists of the

2 means hereinafter fully described and particularly pointed out in the appended claims, the following description setting forth in detail certain embodiments of the invention, such disclosed means constituting, however, but a few of the various forms in which the principle of my invention may be employed.

I have found that a composition comprising an aqueous solution of about 3 parts of a water soluble polyvinyl alcohol, and about 3 parts of a polyethylene glycol having an average molecular weight of about 6,000 is admirably adapted to the accomplishment of the foregoing and related ends. This composition may be prepared in the form of a concentrate containing about 12% by weight of solids, which is to be diluted for final use to about 6% by weight of total solids. "Percent solids" or "total solids," as used herein and in the appended claims refers to the total percentage by weight of components A and B and the solvent medium i. e. water, or water-alcohol, or alcohol. The diluent may contain a water soluble emulsifier in an amount generally within the range of 0.01% to about 1% as may be convenient, or such emulsifying agent may be incorporated in the concentrate in an amount sufficient to provide a concentration within the aforementioned range upon final dilution. Pigments and fillers may also be included in the composition if desired, although the advantage of a clear medium is thereby lost. Component A referred to above is the polyethylene glycol of average molecular weight of about 6,000 and component B is the water soluble polyvinyl alcohol.

By the term "water soluble" as used herein and in the appended claims I mean to include not only materials soluble in water in all proportions, but also materials soluble in water to the extent productive of a substantially homogeneous solution of all the components at the concentration employed, and materials capable of forming substantially stable homogeneous compositions with the aid of solubilizing agents which are compatible in the environment in which the final composition is to be used, i. e., which will not cause the rubber article to become tacky or cause swelling thereof.

As previously indicated, component A is a water soluble polyethylene glycol having an average molecular weight of about 6,000. This material is currently available on the market under the trade name "Carbowax" 6,000 produced by the Carbide & Carbon Chemicals Co. These materials, that is, the "Carbowaxes," are obtainable in a variety of average molecular weights ranging from about 400 to about 10,000, and I prefer for my purposes one having an average molecular weight of about 6,000, although the results of this invention may be obtained with polyethylene glycols within the range of molecular weights mentioned above.

Component B has been defined as a water soluble polyvinyl alcohol.

In general, these materials are obtainable in various viscosities dependent upon the extent of polymerization. These polymers are graded as low, medium, or high viscosity, and for my purposes I prefer to use the low viscosity polyvinyl alcohols although satisfactory results have been obtained in the use of other grades.

While useful and satisfactory compositions have been compounded of the water soluble polyvinyl alcohol and water soluble polyethylene glycol, in water solution, additional components producing improved properties in various respects may also be included in the composition. For example, in certain instances it is desirable to include a wetting agent or emulsifying agent such as any of those listed below in an amount ranging from 0.1% to about 1% of the total composition:

Sulphonated castor oil ("Turkey red oil")
Sulphates of long chain alcohols of from 10 to 14 carbon atoms, e. g. sodium salt of monolauryl sulphate
Dioctyl sodium sulphosuccinate
Alkylaryl sodium sulphonates, e. g. "Keryl" benzene sodium sulphate ("Keryl" derived from kerosene)
Pentaerythritol monolauryate, etc.

I prefer to use the non-ionic wetting agents such as the alkanols.

Since foaming may be a problem with certain of the compositions mentioned above, extremely small concentrations on the order of .0001% to 0.1% of a polymeric alkyl silicone, such as, polymerized methylsiloxane, may be employed as an anti-foaming agent. These are currently available as "Dow-Corning Fluids" of various viscosities. Octyl alcohol may also be used for this purpose in an amount ranging from .05 to 1% by weight of the total composition.

Additional ingredients include pigments such as carbon black, and extenders such as, starches, dextrins, cellulose derivatives and gums; and inorganic salts such as calcium chloride as an extender; and rust inhibitors, such as, sodium nitrite, (.02–.05%) or the alkylolamines, e. g. mono- di-, or triethanolamine.

Since some of the ingredients of these compositions are subject to attack by molds, it has been found advantageous, particularly where long periods of storage are involved, to include a mold inhibitor.

As indicated above, these additional ingredients are not required to produce an operative example of the compositions of this invention, but may be included therein without substantially altering the mode in which these compositions operate.

Solvent

Ordinarily, water is the sole solvent in the compositions of this invention. However, it has been found that mixtures of water and alcohol may be employed as the solvent medium for the principal components A and B mentioned above.

In ordinary practice I prepare these compositions as a liquid concentrate at about 12% by weight total solids. At a higher concentration of total solids, the compositions of this invention are ordinarily gels which, while useful in this condition, are more readily dissolved if maintained in a liquid homogeneous solution. The amount of water required to maintain the solution liquid depends upon the proportion of the ingredients as well as the nature of such ingredients and will, accordingly, be different for different compositions.

It becomes convenient at this point to give examples of specific compositions suitable for final use in accordance with this invention, said examples being illustrative of but a few of the contemplated specific embodiments of this invention, it being understood that such examples are for illustrative purposes only and not to be construed as limiting the invention to the precise compositions shown.

Specific examples of varnishes

EXAMPLE I

| | Percent |
|---|---|
| Polyethylene glycol (MW 6,000) | 3.0 |
| Polyvinyl alcohol (low visc.) | 3.0 |
| Water | 94.0 |

EXAMPLE II

| | Percent |
|---|---|
| Polyethylene glycol (MW 4,000) | 4.0 |
| Polyvinyl alcohol (low visc.) | 2.0 |
| Water | 93.9 |
| Wetting agent | 0.1 |

EXAMPLE III

| | Percent |
|---|---|
| Polyethylene glycol (MW 6,000) | 2.0 |
| Polyvinyl alcohol (low visc.) | 4.0 |
| Water | 93.9 |
| Wetting agent | 0.1 |

EXAMPLE IV

| | Percent |
|---|---|
| Polyethylene glycol (MW 6,000) | 3.0 |
| Polyvinyl alcohol (med. visc.) | 3.0 |
| Water | 83.9 |
| Ethyl alcohol | 10.0 |
| Wetting agent | 0.1 |

EXAMPLE V

| | Percent |
|---|---|
| Polyethylene glycol (MW 8,000) | 3.0 |
| Polyvinyl alcohol (low visc.) | 3.0 |
| Water | 93.6 |
| Octanol-3 | 0.3 |
| Wetting agent | 0.1 |

EXAMPLE VI

| | Percent |
|---|---|
| "Carbowax" 6000 | 3.0 |
| "Elvanol" B 70—05 (polyvinyl alcohol low visc.) | 3.0 |
| Water | 93.9 |
| Wetting agent (alkanol WXN) | 0.1 |

The foregoing examples are illustrative of the finished composition of my invention, it being understood that concentrates may be prepared by reducing the amount of the aqueous medium. In usual practice, it is necessary for the consumer to add only water to the concentrate in an amount sufficient to bring the concentration of the active ingredients within the preferred range or as may be desired.

I am not aware of the mechanism by which the compositions of this invention operate to produce the highly desirable results indicated above. I do not know, however, that water solutions of component A are ineffective for my purposes, and that likewise, water solutions of component B are also ineffective. It is only when the two components are combined in the manner aforesaid that the novel and unexpected results of this invention may be achieved.

The compositions of this invention may be applied to the uncured rubber by any suitable means such as dipping, spraying, doctor blade, or the like. Furthermore, these compositions may be applied to the mold in similar fashion to facilitate removal of the molded article from the mold and enable the production of a product of greater definition than heretofore obtainable.

These compositions will withstand curing and molding temperatures, best results having been obtained with a resin sold under the trade name "Elvanol" type B 70—05 which is a low viscosity polyvinyl alcohol.

The products obtained using the compositions of this invention have a glossy surface which while not ordinarily permanent after a certain period of usage, is, nevertheless, ornamental. These products show no tendency toward swelling, are easily removed from the molds or curing equipment, and where plural sheets undergoing the curing operation in superimposed manner are involved, these are readily separated from one another. There is no altering of the color of the final product since in ordinary cases, these compositions are not pigmented.

An example of the manner in which the compositions of my invention may be employed in actual practice is as follows:

As the rubber sheet stock comes off the calender rolls, it is dipped into the varnish of Examples I–VI above, run between rolls, and then dried, for example, by passing under infra-red lights for a period sufficient to substantially dry the film, in this case about ½ minute. The stock is then cut to length, stacked, and finally molded or cured for 6 minutes at 330° F., back-to-back between hard rubber molds. The sheets are readily separated, evidence no swelling or tackiness, and have a glossy finish. The rubber sheet was ⅛" thick in this case.

In actual practice it is frequently convenient to heat the varnish prior to application as an aid to the drying step. However, in certain instances the solution stability is prematurely adversely affected. For example, if methyl cellulose is included in the composition as an extender, its solubility will tend to decrease as the temperature increases. The composition of Examples I–VI are heat-stable and may be heated prior to application to aid in the subsequent drying step.

In all of the above compositions it appeared that best results were obtained when the varnish was applied at a Gardner-Holdt tube viscosity of about A, although any viscosity within the range of A-3 to R or S may be used under proper conditions of application. At viscosities higher than S, roller application is usually necessary.

While I have specifically referred to rubber in the foregoing specification, the compositions of my invention are useful as separator varnishes for natural rubber, synthetic rubber, reclaimed rubber, mixed natural and synthetic rubbers, asphalt, and other synthetic elastomers.

Other modes of applying the principles of this invention may be employed instead of those specifically set forth above, changes being made as regards the details herein disclosed, provided the elements set forth in any of the following claims, or the equivalents of such be employed.

I, therefore, particularly point out and distinctly claim as my invention:

1. The method of treating relatively contacting superimposed vulcanizable rubber surfaces which comprises applying to the interfacial surfaces a liquid homogeneous aqueous solution comprising in combination about equal parts of a water-soluble polyethylene glycol having an average molecular weight from about 400–10,000, and a water-soluble polyvinyl alcohol in an aqueous medium in a concentration of from about 4% to about 10% by weight total solids, vulcanizing the thus treated relatively contacting superimposed rubber surfaces, and thereafter separating the vulcanized rubber surfaces.

2. The method in accordance with claim 1 in which the polyethylene glycol has an average molecular weight of about 6,000.

3. The method of treating relatively contacting superimposed vulcanizable rubber surfaces which comprises applying to the interfacial surfaces a liquid homogeneous aqueous solution comprising about 3 parts of a water-soluble polyethylene glycol having an average molecular weight of about 6,000, about 3 parts of a water-soluble polyvinyl alcohol and about 94 parts of water, and vulcanizing and separating the vulcanized surfaces.

4. The method of treating unvulcanized rubber surfaces which are to be vulcanized in relatively contacting superimposed manner which comprises applying to the interfacial surfaces of such unvulcanized rubber a liquid homogeneous aqueous solution comprising in combination about equal parts of a water-soluble polyethylene glycol having an average molecular weight of about 6,000 and a water-soluble polyvinyl alcohol in an aqueous medium in a concentration of about 4% to about 10% by weight total solids, substantially removing the aqueous medium from the film thus applied by vulcanizing, and then separating the vulcanized rubber surfaces.

5. The method of treating vulcanizable rubber surfaces which are to be vulcanized in relatively contacting superimposed manner which comprises applying to the interfacial surfaces of such unvulcanized rubber a liquid homogeneous aqueous solution having the following composition:

| | Parts |
|---|---|
| Polyethylene glycol (MW 6000) | 3 |
| Polyvinyl alcohol (low viscosity) | 3 |
| Water | 93.9 |
| Wetting agent | 0.1 | substantially removing the aqueous medium from the film thus applied by vulcanizing and then separating the vulcanized sheets.

CHARLES R. MARTENS.

REFERENCES CITED

The following references are of record in the file of this patent:

UNITED STATES PATENTS

| Number | Name | Date |
|---|---|---|
| 1,543,283 | Falor et al. | June 23, 1925 |
| 2,015,207 | Weller | Sept. 24, 1935 |
| 2,269,660 | Griffin | Jan. 13, 1942 |
| 2,313,703 | Hanna | Mar. 9, 1943 |
| 2,324,601 | Spanagel | July 20, 1943 |
| 2,328,844 | Osterhof | Sept. 7, 1943 |
| 2,346,124 | Dew | Apr. 4, 1944 |
| 2,406,671 | Diamond | Aug. 27, 1946 |
| 2,491,642 | Brant | Dec. 20, 1949 |

OTHER REFERENCES

Carbide and Carbon Chemical Corp. booklet, "Synthetic Organic Chemicals," 12th ed., July 1, 1946, pages 22–23.